March 10, 1959 — R. L. CARLSTEDT ET AL — 2,876,662
DEPTH INDICATOR

Filed May 8, 1957 — 4 Sheets-Sheet 1

INVENTOR
RAGNAR L. CARLSTEDT

BY Toulmin & Toulmin

ATTORNEYS

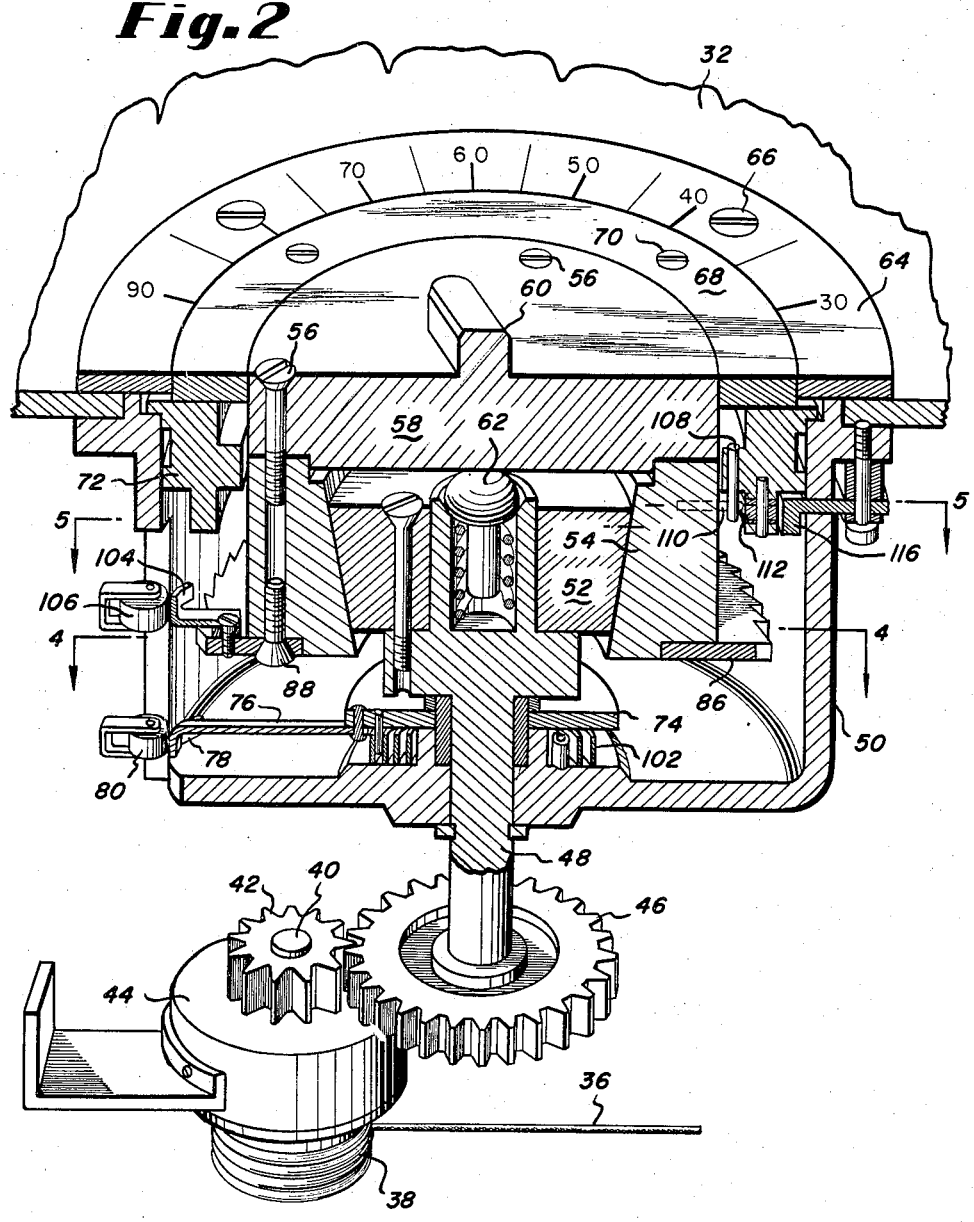

March 10, 1959  R. L. CARLSTEDT ET AL  2,876,662
DEPTH INDICATOR

Filed May 8, 1957  4 Sheets-Sheet 3

INVENTOR
RAGNAR L. CARLSTEDT

BY  Taulmin & Taulmin

ATTORNEYS

March 10, 1959 R. L. CARLSTEDT ET AL 2,876,662
DEPTH INDICATOR
Filed May 8, 1957 4 Sheets-Sheet 4

INVENTOR
RAGNAR L. CARLSTEDT
BY
ATTORNEYS

United States Patent Office 2,876,662
Patented Mar. 10, 1959

2,876,662

DEPTH INDICATOR

Ragnar L. Carlstedt, Cincinnati, Ohio, and Walter Brandt, Stockholm, Sweden, assignors to DHB Corp., New York, N. Y., a corporation of New York Application May 8, 1957, Serial No. 657,773

4 Claims. (Cl. 77—3)

This invention relates to boring machines and in particular to a depth indicating device for boring machines for indicating the depth to which a boring bar has been projected into a workpiece being operated.

A particular object of the present invention is to provide a simple device adapted for easy adjustment and operable for accurately indicating the depth to which a boring bar has been projected into a workpiece so that the operator can always determine the amount of stock yet to be removed.

Another object is the provision of an indicating device of the nature referred to operable upon retraction of the boring bar before completion of the work operation to retain an indication of the depth to which the boring bar was projected into the workpiece whereby the operator can determine the point at which the boring bar will again engage the work when returned to the bore being made.

A still further object of this invention is the provision of an indicator device of the nature referred to which is adapted for actuating control limit switches for regulating the operation of the boring machine.

These and other objects and advantages will become more apparent upon reference to the accompanying drawings in which:

Figure 2 is a transverse sectional view indicated by the line 2—2 on Figures 1 and 3 and showing the overall arrangement of the indicator device;

Figure 1:
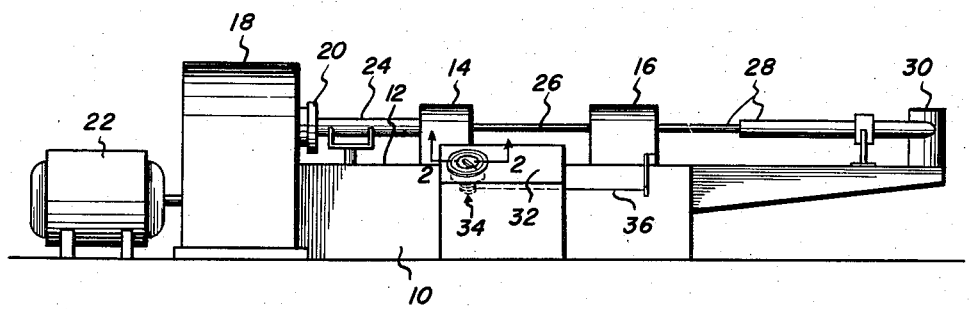
Figure 1 is a side elevational view of a boring machine having an indicator device according to the present invention associated therewith.

Referring to the drawings somewhat more in detail, the boring machine in Figure 1 has a frame 10 the upper part of which forms a bed 12 on which is slidably supported a clamp slide 14 and a boring slide 16. At the left end of the frame 10 is a spindle housing 18 in which is rotatably mounted the spindle 20 drivingly connected with a drive motor 22. Clamp slide 14 is actuated by hydraulic or pneumatic pressure to clamp a workpiece 24 against spindle 20 for being driven in rotation thereby. Clamp slide 14 also contains a passage through which coolant under high pressure is supplied to the bore being formed on the workpiece 24.

Boring slide 16 mounts a boring bar 26 that extends sealingly into clamp slide 14 and has a cutting end thereon to engage the workpiece so that as the workpiece turns it will be cut by the boring bar. Boring bar 26 is hollow and the high pressure coolant is discharged therethrough and then through the telescopic discharge pipe 28 and cyclone 30 to a settling chamber or filter.

According to the present invention there is mounted in the top panel 32 of the control cabinet positioned adjacent frame 10 an indicator mechanism generally indicated at 34 and which is adapted for being actuated by a drive extending therefrom to boring slide 16 and which drive may take the form of a gear drive or a flexible cable drive as indicated at 36.

As will be seen in Figure 2 cable 36 passes about a drum 38 mounted on a shaft 40 carrying pinion 42. The shaft is supported in a housing 44 within which there may be a torsion spring for maintaining the cable 36 taut at all times.

Pinion 42 meshes with a gear 46 on a shaft 48 extending through the back wall of housing 50 of the indicator. Inside the housing shaft 48 has attached thereto a frusto-conical clutch part 52 adapted for frictional driving engagement with a corresponding female clutch part 54 that is attached as by screws 56 to an indicator element 58 having a turning knob 60. A spring pressed plunger 62 carried in a bore in the inner-end of the shaft 48 normally thrusts the two clutch parts into driving engagement. It will be evident however, that the element 58 can be pushed inwardly against the bias of the aforementioned spring thereby to release the clutch parts from each other.

The housing 50 of the indicator device has a dial ring 64 secured thereto as by screws 66 and the dial ring may comprise the means of clamping the indicator to the top panel of the control housing. Disposed between dial ring 64 and the periphery of indicator element 58 is another ring 68 forming a second indicator element and which ring is secured by screws 70 to a ring 72 that has a radial flange engaging a recess about the mouth of housing 50 so that the indicator element 68 and ring 72 are also retained in place by dial ring 64.

Arranged inside the aforementioned bottom wall of housing 50 is a plate or disc 74 which has a first arm 76 thereon terminating in a cam portion 78 adapted for actuating engagement with roller 80 pertaining to a limit switch LS1. The plate 74 also has attached thereto a second arm 82 that has pivoted to its outer end a pawl 84 adapted for engagement with the teeth formed about the periphery of a ratchet plate 86 that is secured to the underneath side of female clutch part 54 by screws 88.

Figure 3:
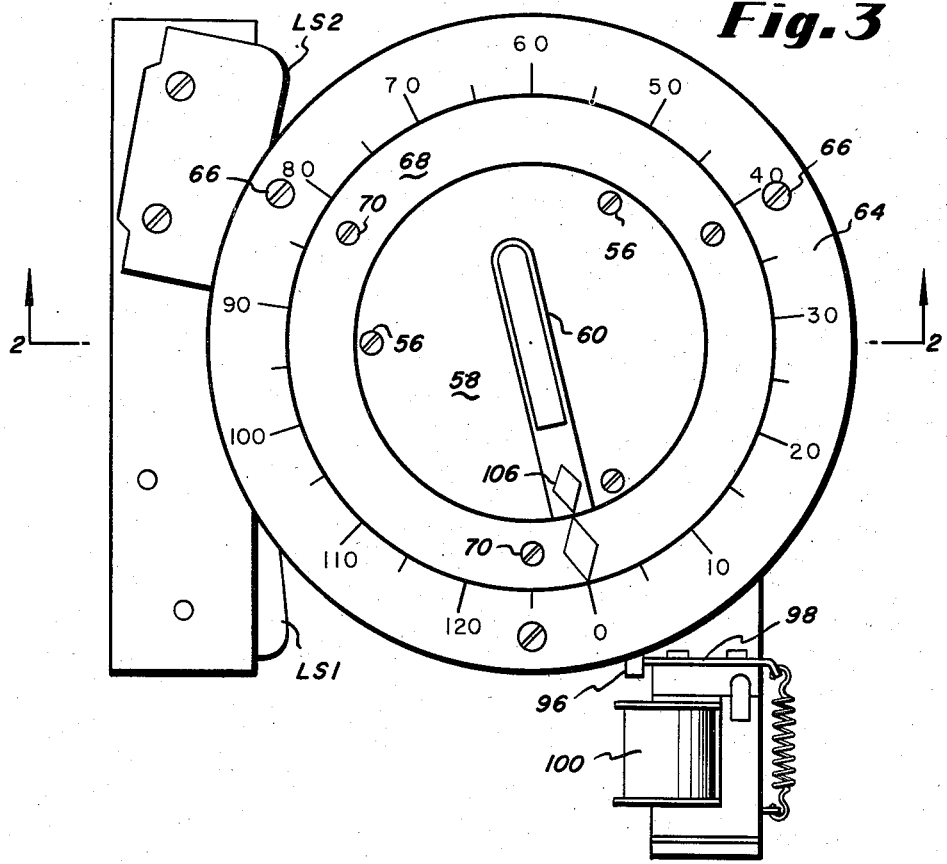
Figure 3 is a view looking in at the face of the indicator device with the supporting panel removed therefrom to show a switch supporting bracket and a ratchet control solenoid associated with the mechanism.
Figure 4:
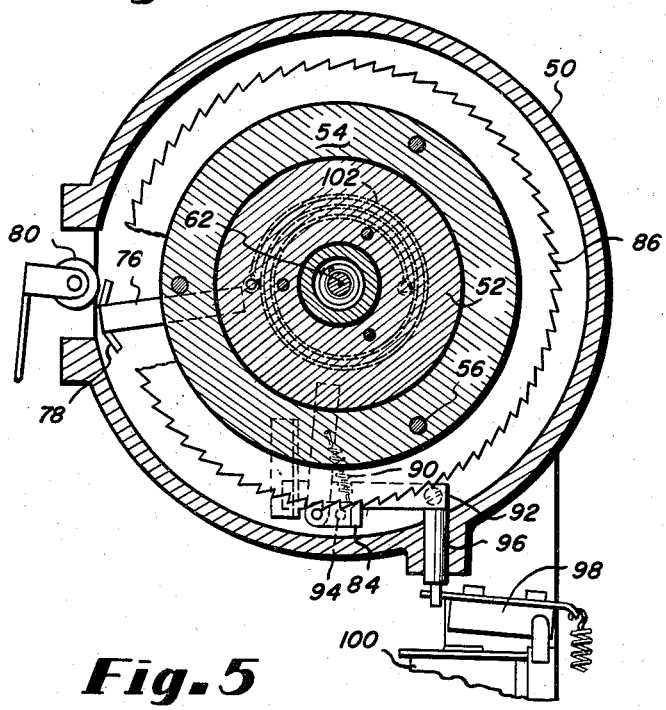
Figure 4 is a sectional view indicated by line 4—4 on Figure 2 showing the ratchet mechanism and a rotatable member pertaining thereto and a switch actuating element of the device.
Figure 5:
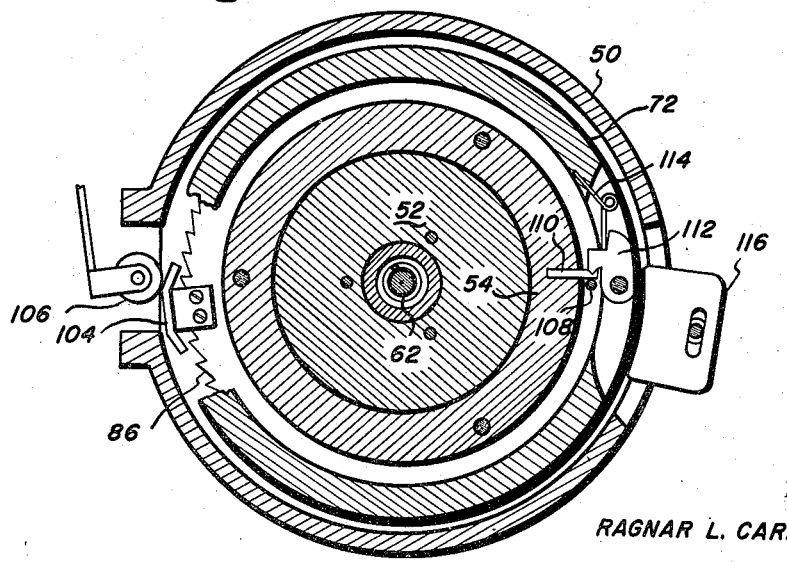
Figure 5 is a secional view indicated by line 5—5 on Figure 2 and shows another rotatable element pertaining to the device and a switch actuating mechanism associated therewith.
Figure 6:
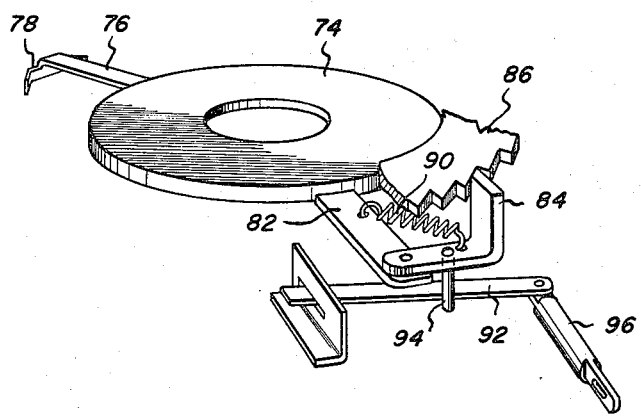
Figure 6 is a fragmentary perspective view showing the construction of the ratchet release mechanism.

As will be seen in Figure 6 pawl 84 is spring urged into engagement with the ratchet plate by a spring 90 and is adapted for being disengaged from the ratchet plate by movement of a bar 92 into engagement with a pin 94 carried on the pawl. Bar 92 is movable by pull rod 96 arranged for actuation by an armature 98 pertaining to electro-magnet 100 illustrated in Figure 3.

Pertaining to plate 74 is a torsion spring 102 by means of which the plate is continuously biased in a direction opposite to the direction in which it is driven by ratchet plate 86, namely, in a clockwise direction as it is viewed in Figure 2.

The ratchet plate 86 also carries a cam element 104 adapted for engagement with roller 106 pertaining to the actuating element of limit switch LS2.

One of the aforementioned limit switches is actuated when the boring slide reaches its fully retracted position and the other thereof is actuated when the boring slide approaches its fully advanced position. At this point it will be apparent that movement of the boring slide will cause movement of ratchet plate 86 in one direction or the other and that the plate 74 will also be moved by the ratchet plate at least for a distance until the electro-magnet 100 is energized. Since the indicator element 58 moves with the boring slide the indicia 106 thereon always points to a numeral on dial ring 64 that indicates the amount of travel yet remaining for the boring slide.

The ring 68, on the other hand, always indicates the amount of material yet to be removed from the bore regardless of the position occupied by the boring bar and boring slide. This is accomplished by providing ring 72 with a pin 108 adapted for engagement with pin 110 on clutch part 54 so that as clutch part 54 moves due to advancing movement of the boring slide the ring 72 and indicator element 68 carried thereby will move together with indicator element 58 whereas retraction of the boring slide will normally permit retracting movement of the indicator element 58 but indicator element 68 and ring 72 connected therewith will remain in place.

Figure 7:
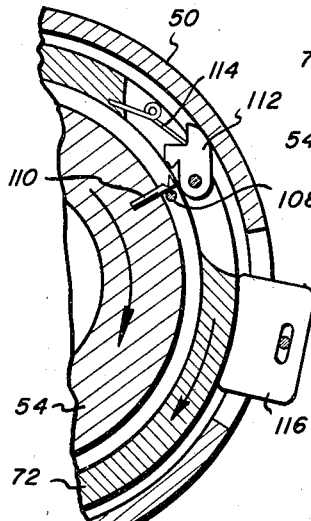
Figures 7 through 9 are fragmentary sectional views showing a mechanism for lifting the two rotatable pointer elements of the device together for simultaneous return after completion of a boring operation.
Figure 8:
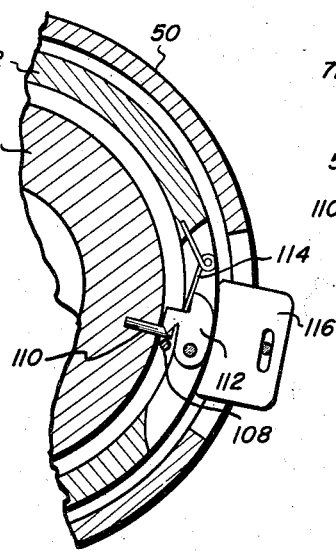
Figure 9:
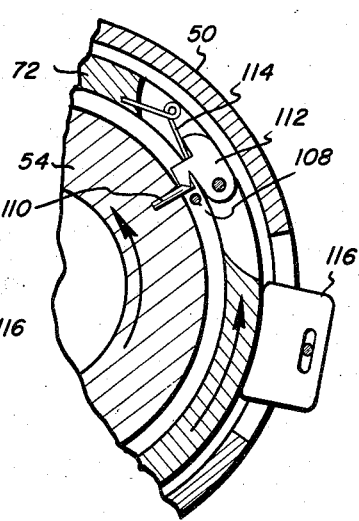

As the boring bar approaches the end of its advancing travel it becomes desirable to inter-connect the indicator elements for retraction thereof in unison. This is accomplished by the mechanism illustrated in Figures 7, 8 and 9 wherein it will be seen that ring 72 carries a pawl element 112 normally urged outwardly by a spring 114 away from the end of pin 110. The pawl element 112 and the pin 110 are installed so as to be inter-engageable as illustrated in Figures 7, 8 and 9 and in which position the reverse rotation of indicator element 58 will cause reverse rotation of ring 72.

Pawl element 112 is cammed into a latching position with pin 110 by a cam element 116 carried by housing 50 and with this cam element being located so as to cause the said inter-engagement at just about the time that the boring operation on the workpiece being machined is completed.

From the foregoing it will be perceived that the present invention discloses a relatively simple mechanism that always indicates the position of the boring bar and also always indicates the amount of stock yet to be removed from the workpiece with the two indicator elements being separated, so far as retraction movement is concerned, until the boring bar has completed its advancing stroke.

In operation of the device, if it is assumed that the boring slide is completely retracted and a boring operation is to be commenced the cam element 78 is positioned slightly rearwardly of roller 80 which it actuates. At this time the electro-magnet 100 is de-energized and pawl 84 engages ratchet plate 86. Advancing of the boring slide is then commenced and this will cause rotation of the indicator mechanism by movement of the cable 36 and rotation of the drum 38, shaft 40, gears 42 and 46, shaft 48, clutch parts 52 and 54, and indicator element 58. After about three or four degrees or so of movement of plate 74, the pertaining switch LS1 is actuated thus energizing electro-magnet 100 and disconnecting the pawl 84 from ratchet plate 86 and also simultaneously energizing the drive motor for the spindle and the driven motor for the coolant pump.

The boring operation continues until the boring bar breaks through the workpiece and at which time the boring operation is completed.

If, at this time the indicator elements do not point to zero on dial 64, then indicator element is pressed inwardly and manually turned to this point. Releasing of the indicator element will then again lock it to shaft 48 and thereafter the indicator elements will remain closely adjusted for the particular set up being employed.

The movement of dial 58 and clutch part 54 connected thereto to the position where the index on the dial element points to zero also brings the cam 104 thereof into actuating engagement with switch roller 106 whereby the limit switch pertaining thereto is actuated thus de-energizing the drive motor for the spindle and the motor for the coolant pump. This can be accomplished by de-energizing the electro-magnet 100 pertaining to the control relay.

At this time the boring slide is retracted to its starting position and a new operation can be carried out.

It will be appreciated that as soon as the boring slide commences its advancing stroke the pawl 112 will disengage from pin 110 so that the indicator elements will be separated from one another until latched together at the end of the boring operation.

It will be understood that this invention is susceptible to modification in order to adapt it to different usages and conditions; and, accordingly, it is desired to comprehend such modifications within this invention as may fall within the scope of the appended claims.

We claim:

1. In an indicator and control device for a boring machine having a boring slide and a spindle motor, a frame having a dial, a pair of concentric index members having index marks to register with the dial, a drive connection from the boring slide to one of said index members, said driving connection including a clutch whereby the said one index member can be adjusted so its index mark points to zero on the dial when the boring slide is fully advanced, switching means arranged for actuation by said one index member when its index mark points to zero to control the spindle motor of the boring machine, a second switch for energizing the spindle motor of the boring machine, an actuating element for said second switch, means for connecting the actuating element with said one index member when advancing movement of the boring slide is commenced for actuation of the second switch, means responsive to the actuation of the second switch for energizing the spindle motor and for disconnecting the actuating element from said one index member, there being spring means biasing said actuating element back to its starting position, and there being a one-way driving connection between said index members in the advancing direction when the index marks thereof are in register and a one-way driving connection therebetween in the opposite direction adapted for being established when the boring slide is fully advanced and for being made ineffective when the boring slide commences an advancing movement.

2. In a boring machine; a frame, a boring slide movable on said frame, and indicator means for indicating the position of the boring slide on the frame at the point of maximum advance of the boring slide, said indicator means comprising a stationary indicator dial, concentric indicator members associated with the dial, a drive from the boring slide to one of the indicator members for movement of the indicator member therewith, a one-way drive between said indicator members in the advancing direction of the boring slide, and a normally ineffective driving connection adapted for being established between said indicator members when the boring slide is fully advanced and becoming ineffective when the boring slide commences an advancing movement following retraction thereof, there being a friction clutch in said driving connection, said friction clutch comprising a spring loaded friction clutch adapted for disengagement by exerting pressure on said one indicator member.

3. In an indicator and control device for a boring machine having a boring slide and a spindle motor, a frame having a dial, a pair of concentric index members having index marks to register with the dial, a drive connection from the boring slide to one of said index members, said driving connection including a clutch whereby the said one index member can be adjusted so its index mark points to zero on the dial when the boring slide is fully advanced, switching means arranged for actuation by said one index member when its index mark points to zero to control the spindle motor of the boring machine, a second switch for energizing the spindle motor of the boring machine, an actuating element for said second switch, means for connecting the actuating element with said one index member when advancing movement of the boring slide is commenced for actuation of the second switch, means responsive to the actuation of the second switch for energizing the spindle motor and for disconnecting the actuating element from said one index member, and spring means urging said actuating element back to its starting position.

4. In an indicator and control device for a boring machine having a boring slide and a spindle motor, a frame having a dial, a pair of concentric index members having index marks to register with the dial, a drive connection from the boring slide to one of said index members, said driving connection including a clutch whereby the said one index member can be adjusted so its index mark points to zero on the dial when the boring slide is fully advanced, switching means arranged for actuation by said one index member when its index mark points to zero to control the spindle motor of the boring machine, a second switch for energizing the spindle motor of the boring machine, an actuating element for said second switch, means for connecting the actuating element with said one index member when advancing movement of the boring slide is commenced for actuation of the second switch, means responsive to the actuation of the second switch for energizing the spindle motor and for disconnecting the actuating element from said one index member, and spring means urging said actuating element back to its starting position, said index members having a one-way driving connection for operation when the index marks thereof are in register in the advancing direction and which driving connection is rendered ineffective when the boring slide reaches its fully advanced position.

References Cited in the file of this patent
UNITED STATES PATENTS

| | | |
|---|---|---|
| 1,888,298 | Teesdale | Nov. 22, 1932 |
| 2,728,248 | De Vlieg | Dec. 27, 1955 |

FOREIGN PATENTS

| | | |
|---|---|---|
| 339,643 | Germany | July 29, 1921 |